Feb. 9, 1971 W. E. BEAL 3,561,935
AUTOMATED FUEL TEST AND CONTROL APPARATUS
Original Filed July 17, 1963 10 Sheets-Sheet 1
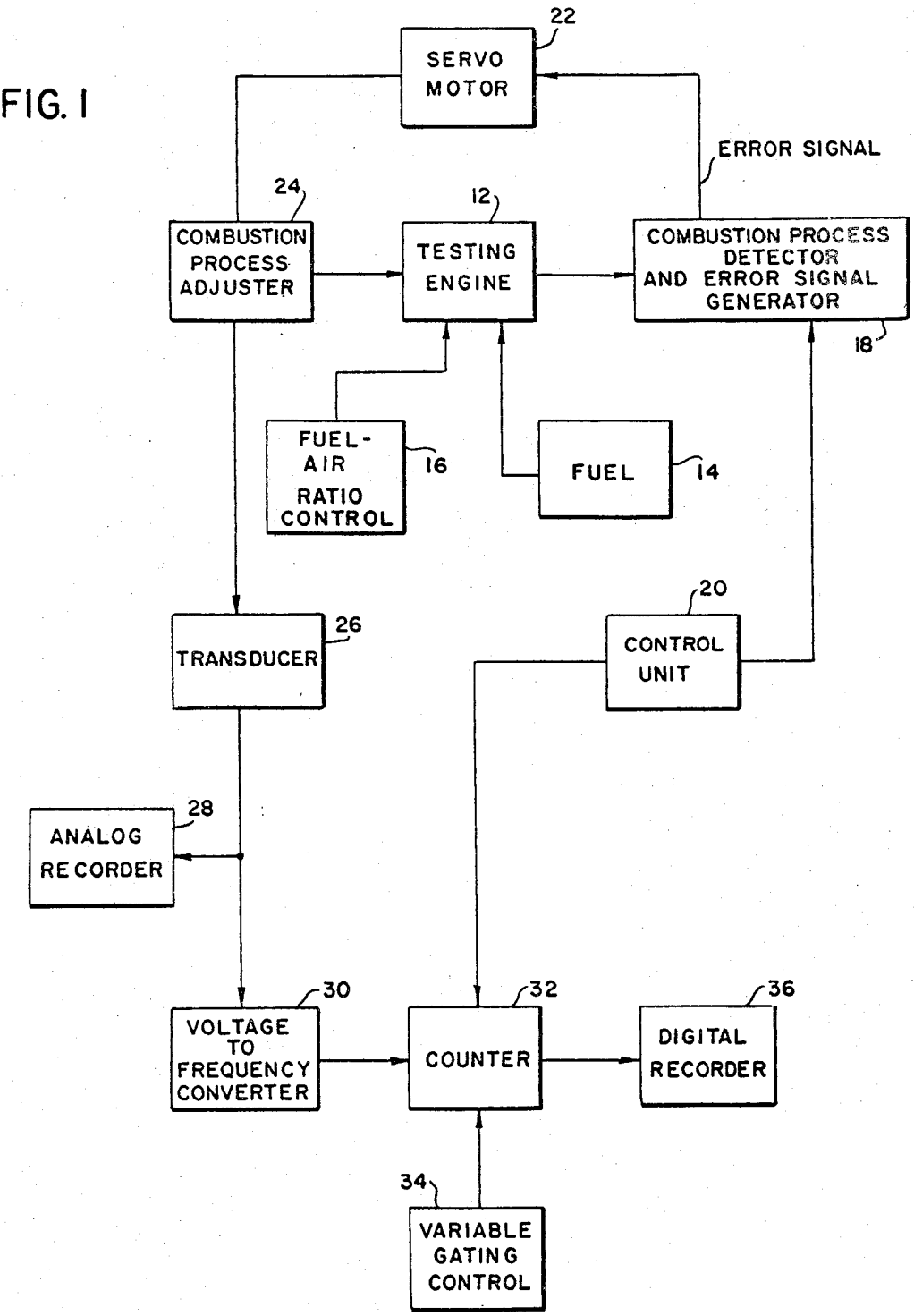
FIG. I
INVENTOR.
William E. Beal
BY James F. Powers Jr.
Attorney

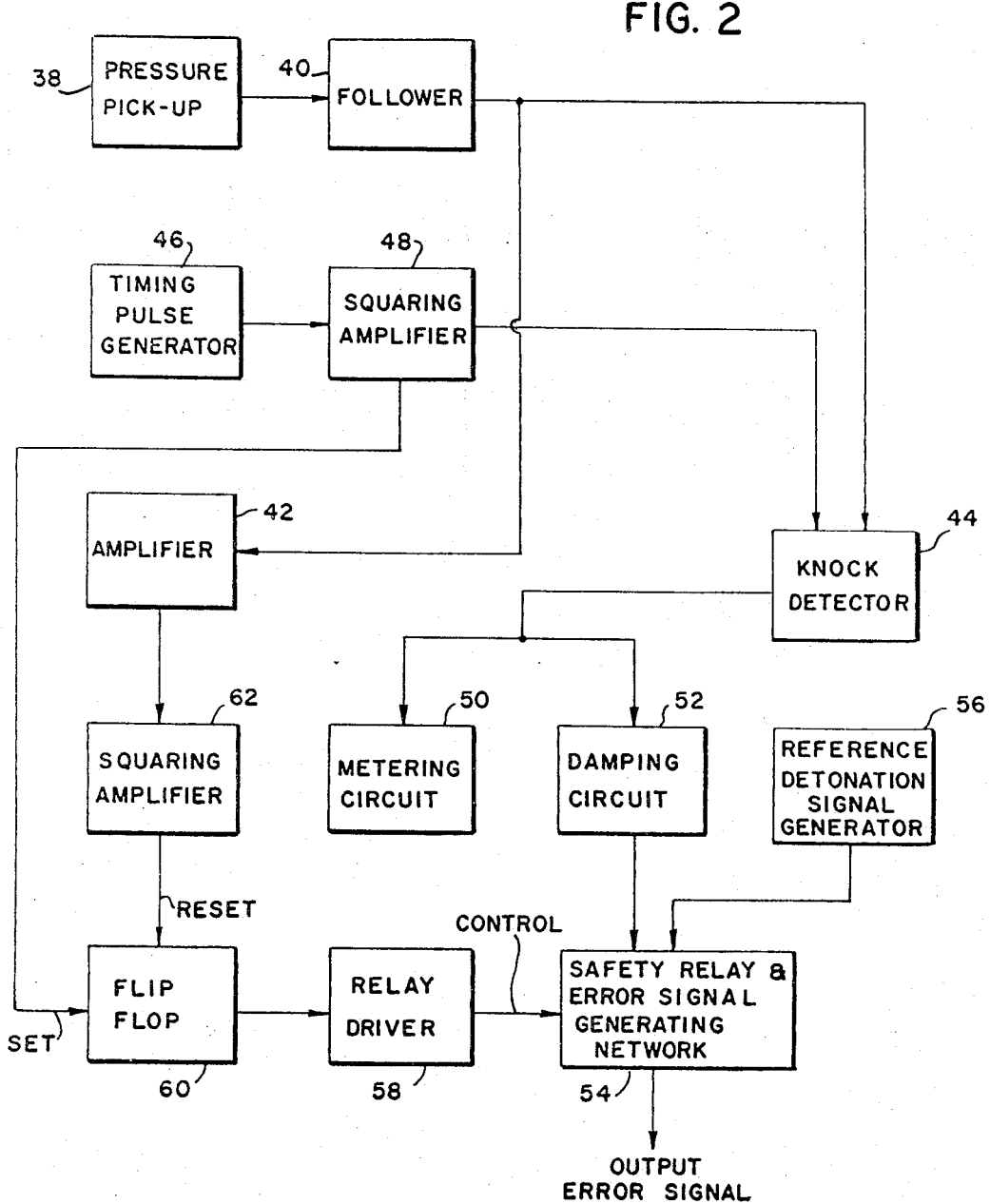

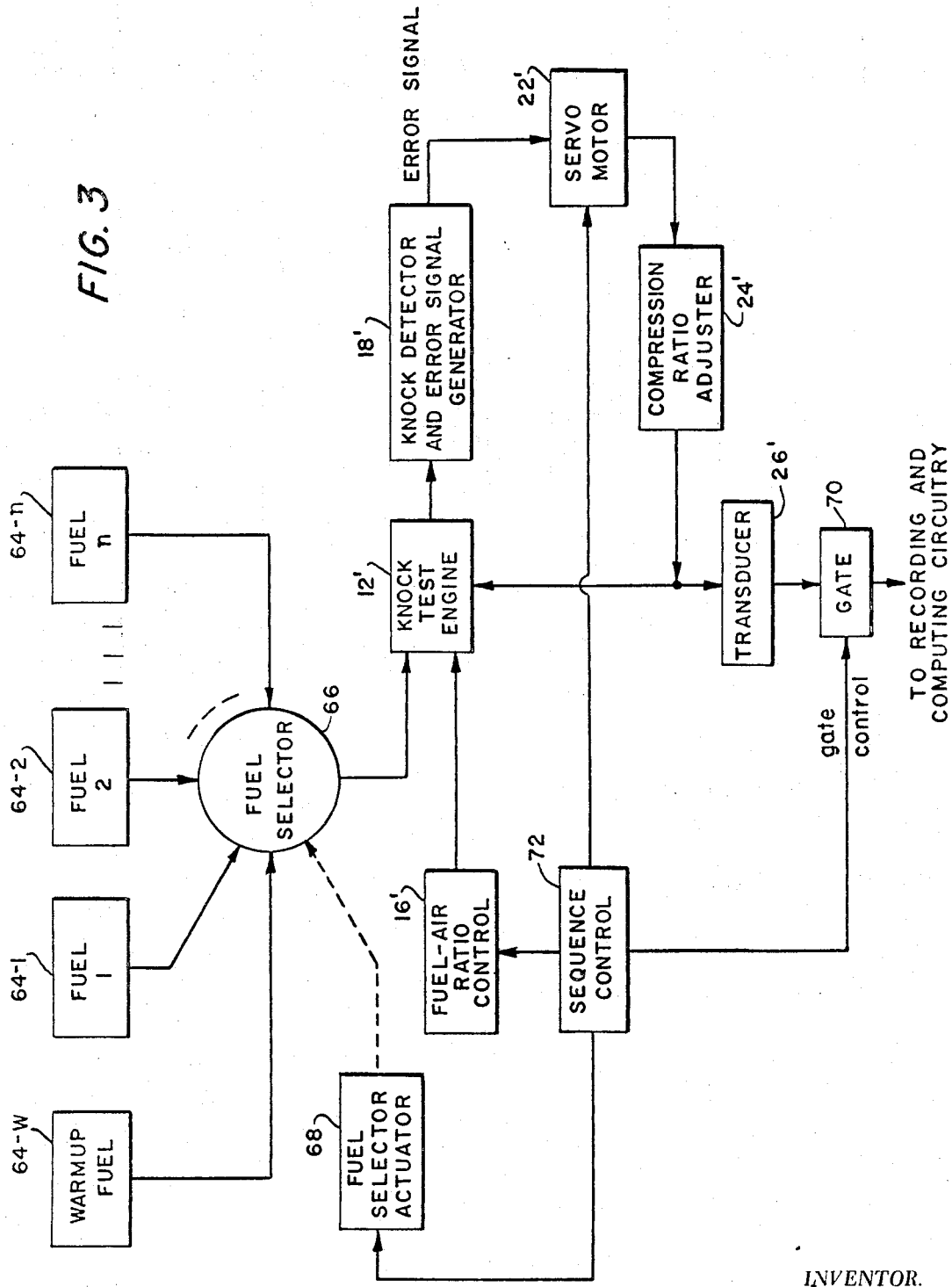

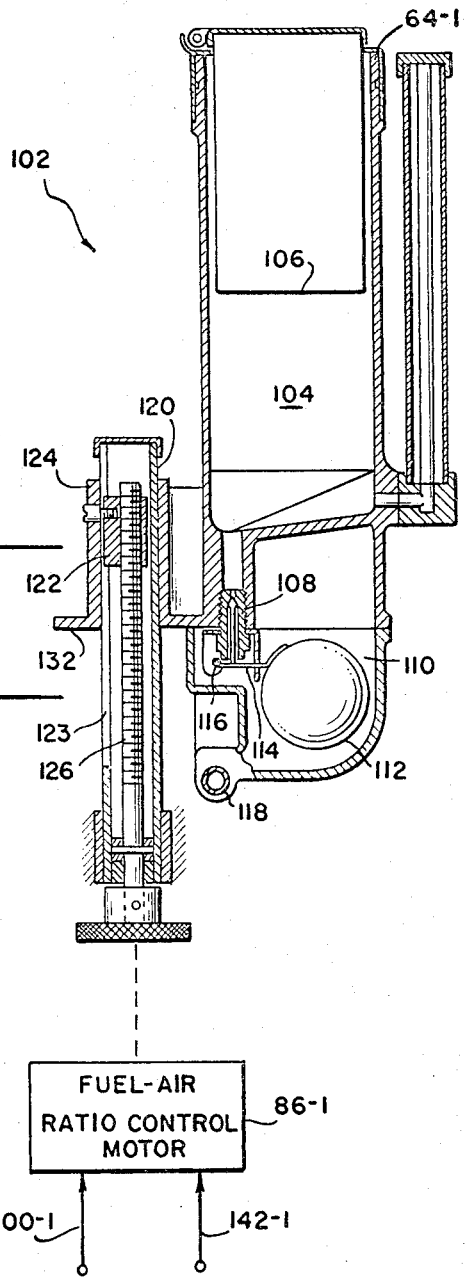

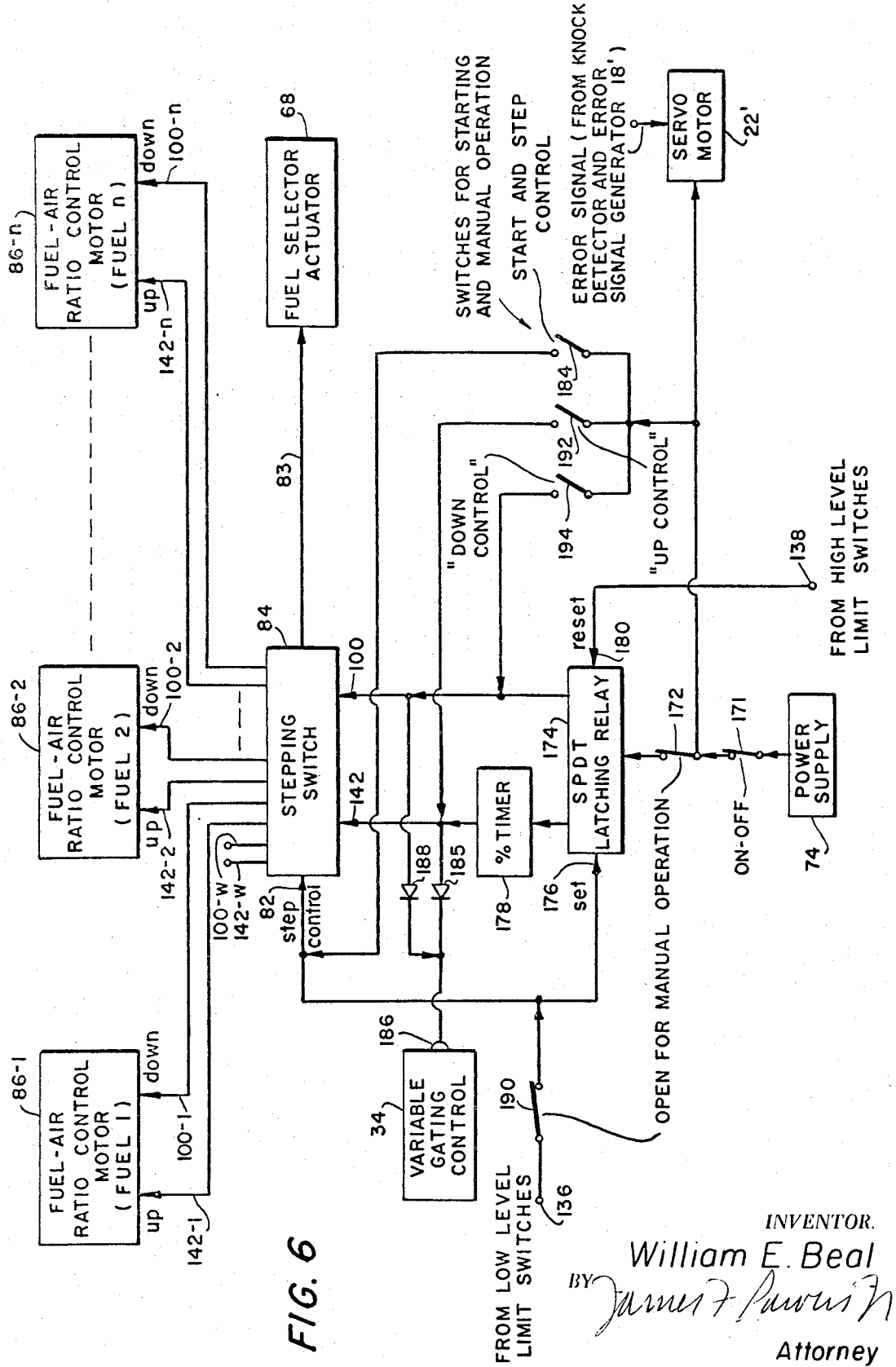

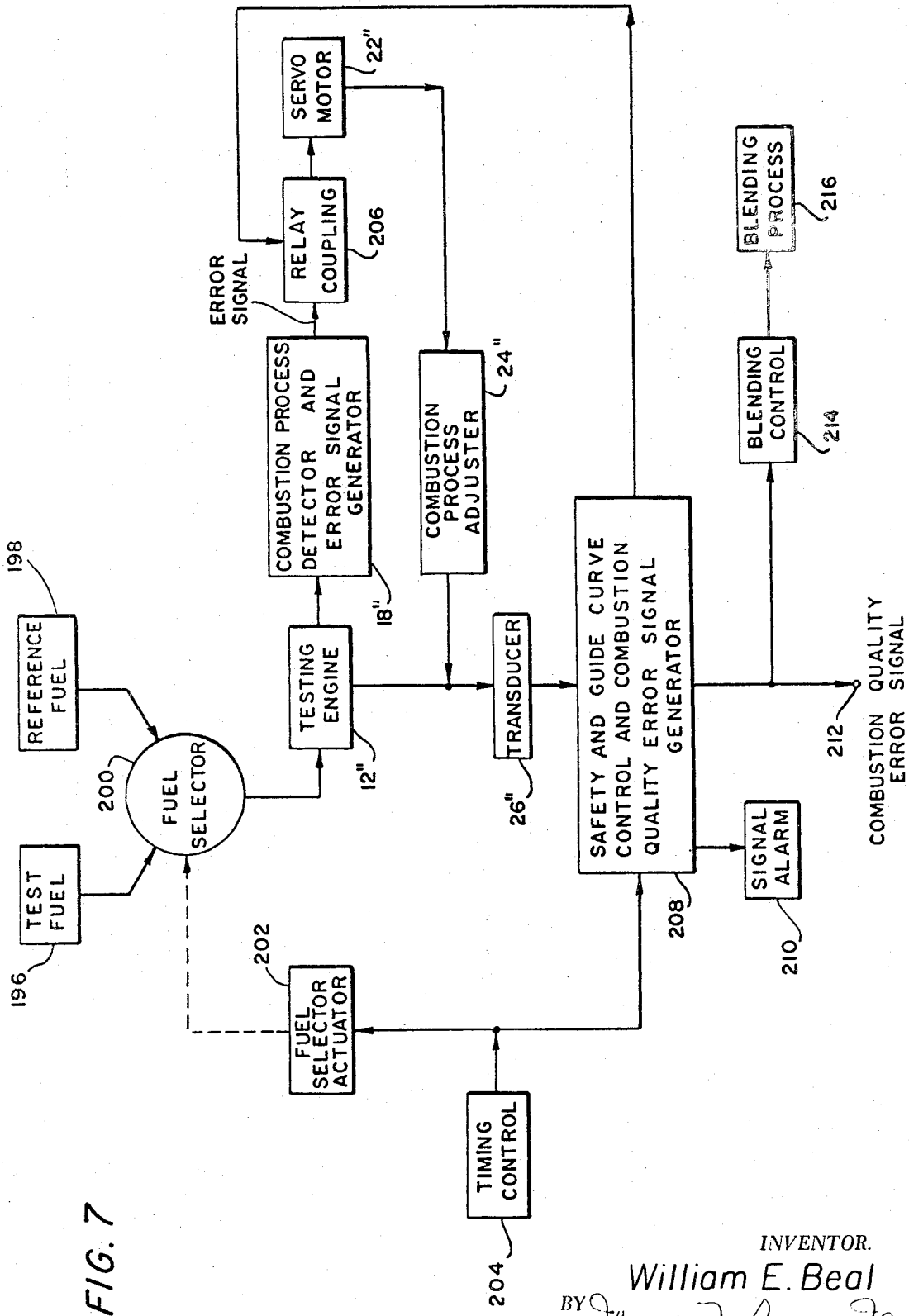

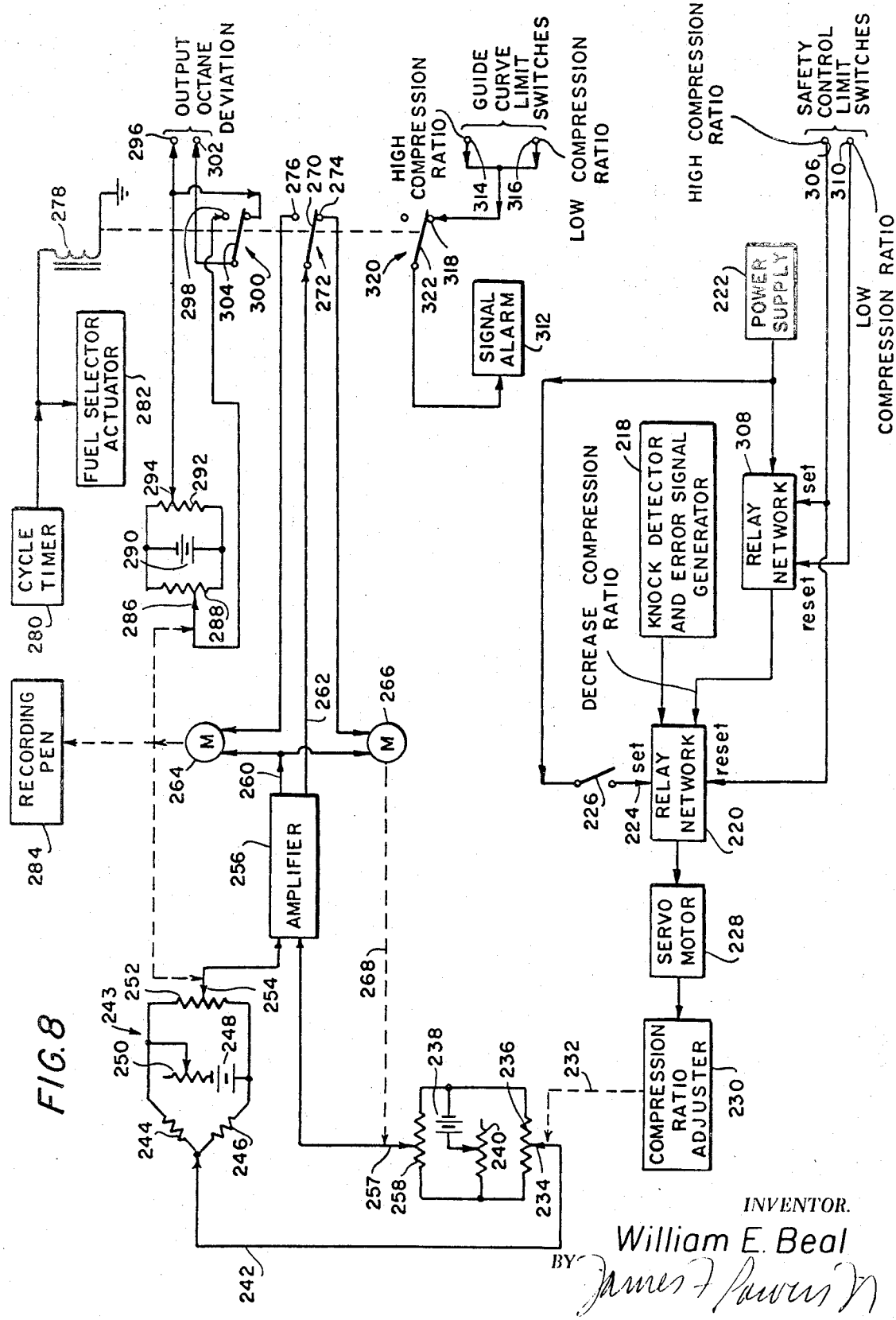

INVENTOR.
William E. Beal
BY James F. Powers Jr.
Attorney

3,561,935
AUTOMATED FUEL TEST AND CONTROL APPARATUS
William E. Beal, Pitman, N.J., assignor to Mobil Oil Corporation, a corporation of New York
Application July 17, 1963, Ser. No. 295,733, which is a continuation-in-part of application Ser. No. 160,051, Dec. 18, 1961. Divided and this application Jan. 9, 1969, Ser. No. 790,117
Int. Cl. C10l 1/04
U.S. Cl. 44—2                5 Claims

ABSTRACT OF THE DISCLOSURE

A system for controlling a combustion quality of a fuel, e.g., octane or cetane value, wherein the detonation intensity or time lag of a test fuel powering a standard test engine is compared to a reference value to generate an error signal. The compression ratio of the engine is adjusted in response to a function of the error signal to maintain a predetermined condition of detonation intensity or time lag, and the amount of adjustment of the compression ratio provides a representation of the combustion quality of the fuel. The system also includes means for controlling a process of blending the test fuel to a predetermined specification in response to a signal which is a function of the amount of adjustment of the compression ratio.

---

This application is a division of copending application Ser. No. 295,733 filed July 17, 1963, for Automated Test and Control Apparatus which, in turn, is a continuation-in-part of application Ser. No. 160,051 filed Dec. 18, 1961, for Apparatus for Determining the Combustion Quality of a Fuel, now U.S. Pat. No. 3,238,765.

This invention relates to the determination of the combustion quality of a fuel for internal combustion engines by test in a standard engine. More particularly, it relates to the automatic regulation of such a standard engine during a test in accordance with the combustion process of the fuel in the engine, as well as the use of the engine to supply information regarding the combustion quality of a test fuel with respect to a reference fuel, which is useful, for example, in the blending of a fuel product so that it conforms in combustion quality to the reference fuel.

With the recent developments in automotive engines and in automotive engine fuels, testing procedures for determining the combustion quality of such fuels to aid in maintaining pre-established fuel standards have become all important. One particular testing procedure is disclosed in copending application Ser. No. 160,052, for Automated Engine for Determining the Combustion Quality of a Fuel, filed on Dec. 18, 1961, now U.S. Pat. No. 3,312,102, in the name of A. E. Traver and assigned to the same assignee as the present application. In that application, a testing spark ignition engine or a testing compression ignition engine is powered by a fuel under test and is automatically regulated so as to maintain substantially constant a particular aspect of the combustion process of the fuel. In one form of that invention, the compression ratio of the engine is continually adjusted so that detonation, if the fuel under test is a gasoline, or ignition, if the fuel under test is a diesel fuel, occurs during a predetermined interval in each engine cycle. In another form of that invention for the testing of gasolines, detonation is retained at a relatively fixed magnitude by a continuous adjustment of the compression ratio. The combustion quality of the test fuel is determined by comparing the compression ratios of the engine using the test fuel with ratios obtained under similar conditions using reference fuels of known combustion qualities to power the engine.

The automatic regulating system of the copending application Ser. No. 160,052 is a "no-null" system in which the compression ratio is continuously changed, i.e., increased in response to a reference signal generated once during each engine cycle and decreased in response to detonation or ignition of a predetermined character. The present invention, however, involves a "null type" system for automatically regulating an engine powered by a test fuel. In particular, signals indicative of detonation of a gasoline or ignition of a diesel fuel are generated and compared with reference signals that are representative of a predetermined detonation or ignition time in an engine cycle, for example. As a result of the comparison, an error signal is generated that is applied to a servo motor coupled to the testing engine which controls a variable element thereof, for example, the compression ratio of the engine. The error signal drives the servo motor to change the compression ratio so that the actual detonation or ignition time corresponds very closely to the predetermined time. Thus, the compression ratio is established at a "null" point at which the error signal is equal to a reference value, and the compression ratio is changed whenever necessary to maintain the error signal at this reference value. Alternatively, in the case of a test gasoline, the compression ratio is changed in response to an error signal that is representative of the difference between the magnitude of the actual detonation occurring and the magnitude of a predetermined reference detonation.

A safety feature is incorporated to prevent the compression ratio from being changed to an extreme value. In particular, there is provided means for automatically reducing the error signal to zero if combustion or detonation is absent during any engine cycle, thereby causing the servo motor that adjusts the compression ratio to cease operation, which prevents the motor from increasing the compression ratio to an extreme limit which it would normally do in the absence of combustion or detonation.

The invention further contemplates the programming of the engine to test a plurality of fuels, the engine being regulated during the testing of each fuel to carry out the different steps of a typical test. Specifically, in the testing of a gasoline, for example, the standard test procedure of the American Society for Testing Materials (ASTM) prescribes that the test gasoline be supplied to the engine in a combustible fuel-air mixture having a fuel-air ratio which results in maximum intensity detonation of the mixture in the engine and that the compression ratio of the engine be adjusted for a standard detonation intensity. Heretofore, this has been accomplished by manual adjustment of the test engine, in accordance with the present invention, the selection of the fuel-air ratio that produces maximum intensity detonation and the selection of the compression ratio to provide standard detonation intensity is carried out with the approved ASTM engine automatically regulated as described above in response to the error signal and automatically adjusted as to fuel-air ratio.

In the adjustment of fuel-air ratio, one aspect of the invention contemplates first reducing the fuel-air ratio to a lower limit, and then increasing the fuel-air ratio until maximum intensity detonation is achieved. By increasing the fuel-air ratio to maximum intensity detonation, as distinguished from decreasing the ratio to this point, it is possible that there may be eliminated the residual or "hangover" effects upon engine performance of a rich fuel mixture (high fuel-air ratio) formerly supplied to the engine presently being supplied with a lean mixture (low fuel-air ratio). Following this adjustment of fuel-air ratio, the compression ratio of the engine is then automatically adjusted in response to the error signal, as described above, to result in a detonation which conforms to a standard detonation intensity prescribed for the test.

Another aspect of the invention, involving a departure from the standard ASTM test procedure, contemplates changing the fuel-air ratio in a series of discrete steps from one fuel-air ratio to another. Concurrently, with the step-type changes in fuel-air ratio, the compression ratio of the engine is automatically adjusted in response to the error signal to result in detonation conforming to the standard detonation intensity. By this technique, the engine operation passes through the fuel-air ratio that produces maximum intensity detonation, and, for this fuel-air ratio, the compression ratio in the engine which results in the standard knock intensity is used as an indication of the octane quality of the gasoline under test.

In the testing of a plurality of fuels, the engine is automatically regulated as described above with regard to fuel-air ratio and compression ratio for each one of the fuels. After a particular fuel has been tested, a fuel selector is actuated so as to select another fuel for test. Following the testing of all the fuels, the selector is actuated to switch automatically to a warm-up fuel by which the engine is powered until the testing of another plurality of fuels is initiated.

The invention also contemplates the use of an engine automated as described above to monitor continuously a test fuel product, and, by alternately supplying it with a reference fuel, to calibrate automatically the engine and to generate signals representative of the difference in combustion quality between the test and reference fuels. Specifically, the engine is supplied with the reference and test fuels in time sequence, and there is stored the adjustment of the compression ratio to achieve constant knocking, for example, when the engine is powered by the reference fuel. An error signal is developed representative of the difference between this stored compression ratio and the compression ratio adjustment when the engine is powered by the test fuel. The errror signal, representative of the difference in octane number between a test and a reference gasoline, for example, may be used to control a blending process to vary the composition of the test fuel so that it conforms in combustion quality to that of the reference fuel. A reference or set point signal also may be independently generated to provide a reference for comparison with the error signal. In this fashion, a "floating base" may be provided for the error signal, which is useful if it is desired, for example, to blend the test fuel product not to the reference fuel but to some other reference fuel bearing a predetermined relation to the reference fuel actually supplied to the engine.

During the time that the reference fuel is supplied to the engine, the invention also contemplates determining whether or not the engine is operating within specified tolerances. In particular, due to the rigid standards established for test engines of the type described above, it is known beforehand, within fairly close limits, what the engine compression ratio should be for a particular reference fuel if the engine is operating properly. If the compression ratio is detected as being outside these limits during the operation of the engine on the reference fuel, a signal alarm is actuated to warn of improper engine operation.

Additionally, a further safety feature besides that described above with respect to absence of combustion or detonation in an engine cycle is employed to prevent engine operation at an extreme compression ratio. If the compression ratio reaches a predetermined limit, such as an extremely high compression ratio, the automatic regulation of compression ratio is stopped, and the compression ratio is changed to a predetermined lower setting at which it is maintained until the automatic regulation of the engine is once again manually established.

For a more complete understanding of the invention, reference is made to the following detailed description of several representative embodiments and to the appended drawings, in which:

FIG. 1 is a block diagram of a basic system in accordance with the invention for automatically regulating a test engine to determine the combustion quality of a fuel;

FIG. 2 is a block diagram of a circuit for instrumenting one of the components in the system of FIG. 1;

FIG. 3 is a block diagram of a system in accordance with the invention for testing a plurality of fuels in a test engine and regulating the engine to carry out the different steps of a typical test for each fuel;

Figure 4A:
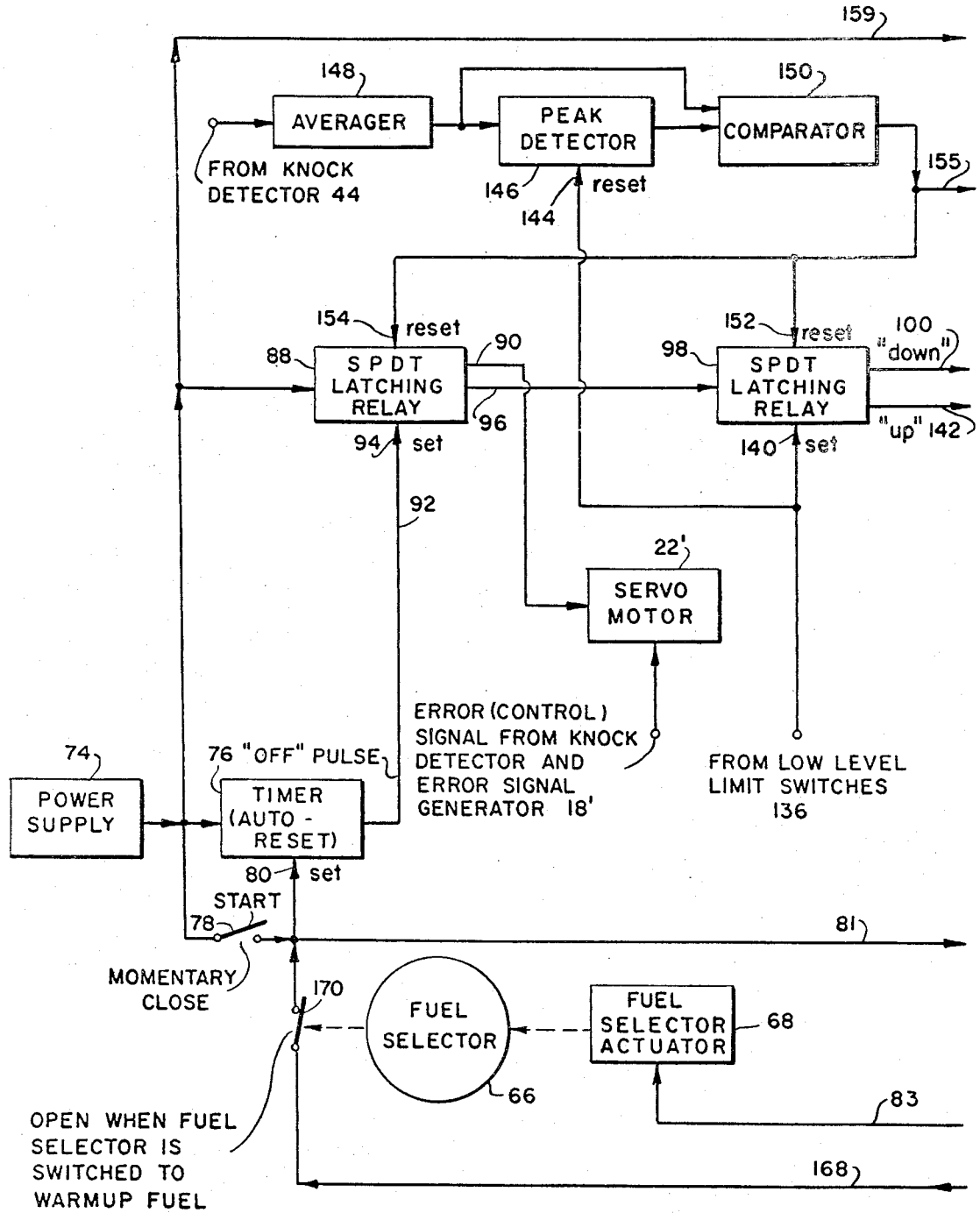
Figure 4B:
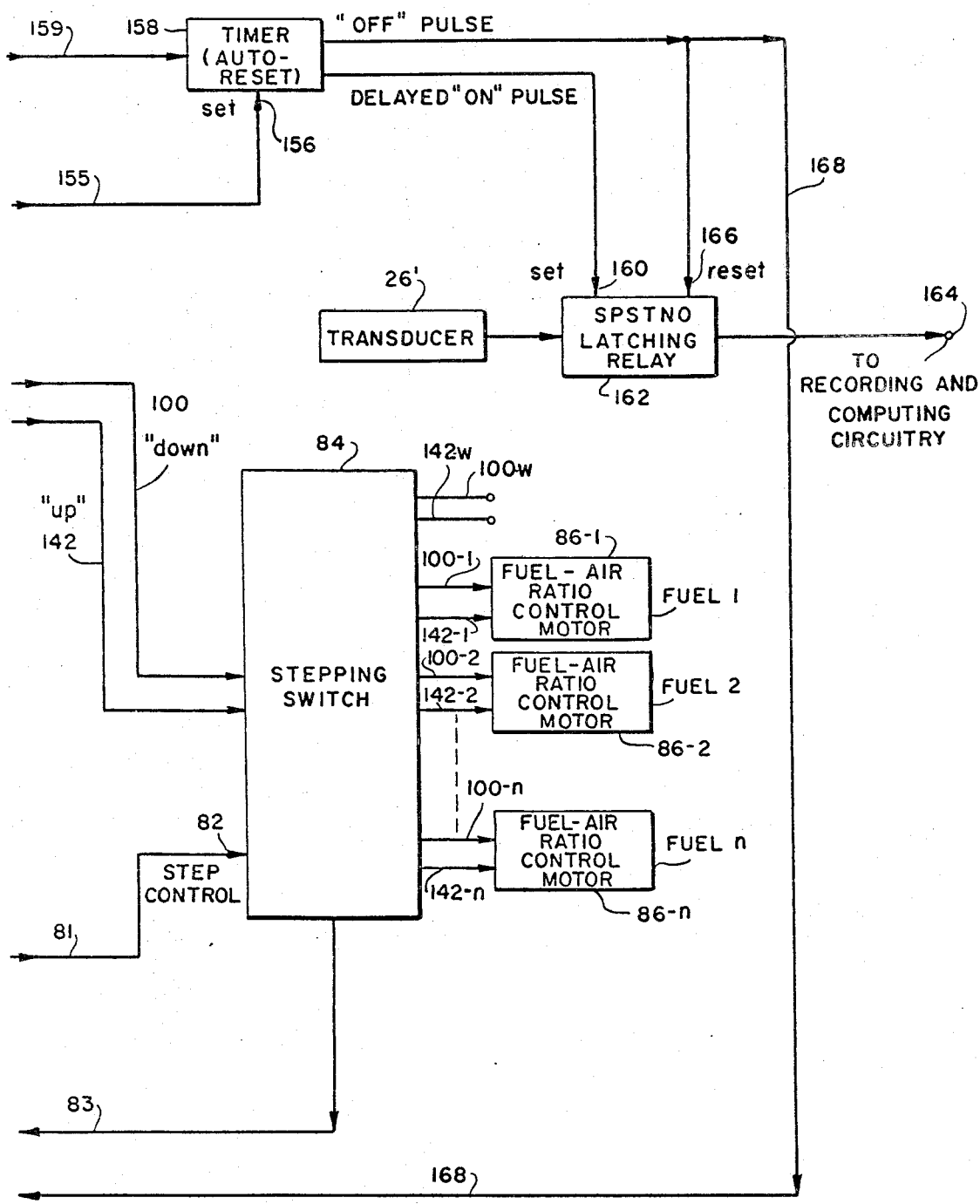
Figure 9:
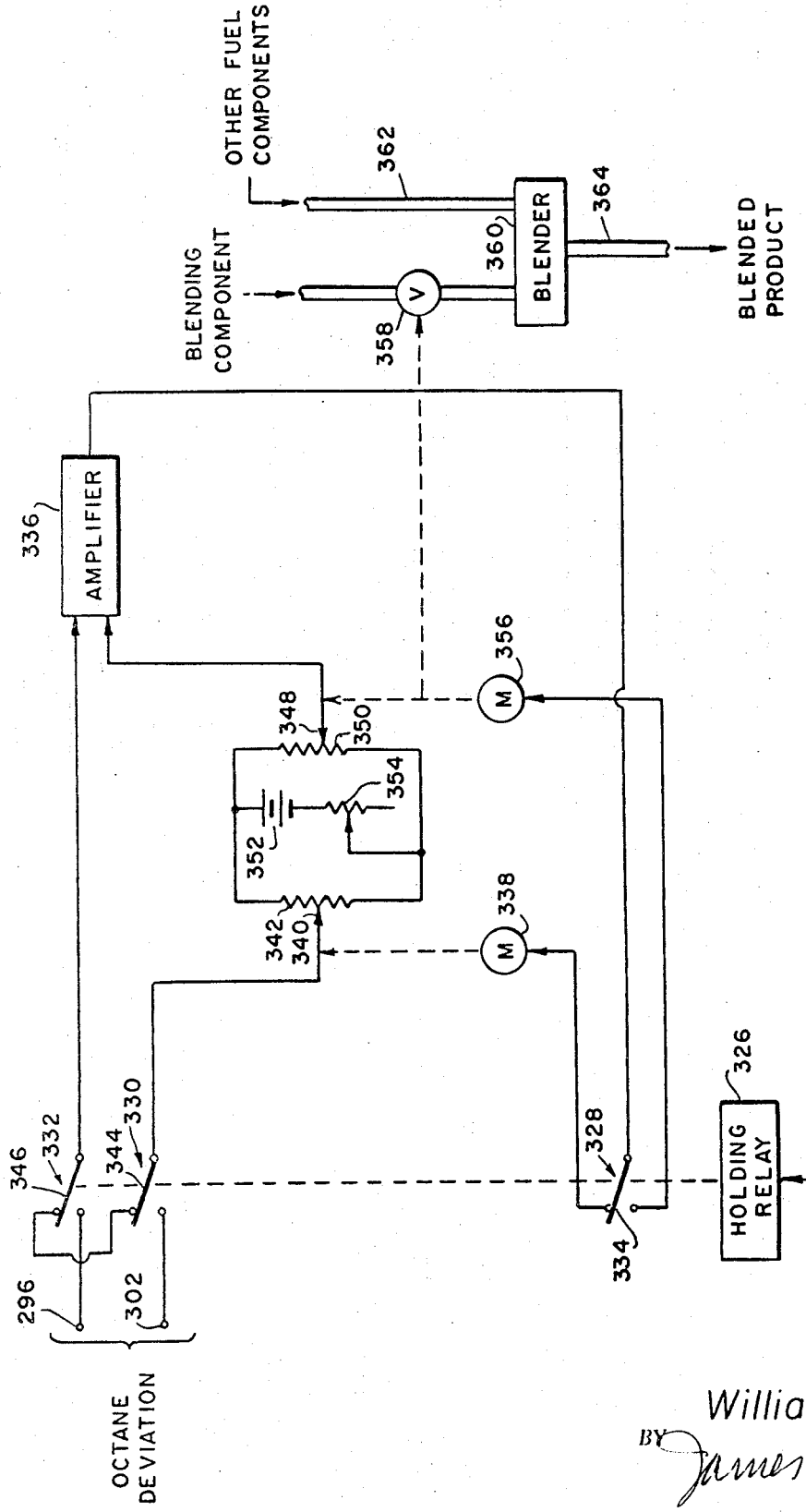

FIGS. 4A and 4B, taken together, are a block diagram of a control circuit useful in the system of FIG. 3;

FIG. 5 is a diagram of a fuel-air ratio control useful in the system of FIG. 3;

FIG. 6 is a block diagram of another control circuit useful in the system of FIG. 3;

FIG. 7 is a block diagram of a system in accordance with the invention to determine the combustion quality of a test fuel with respect to a reference fuel to develop a signal useful for blending a fuel product;

FIG. 8 is a block and schematic circuit diagram of a system in accordance with FIG. 7; and FIG. 9 is a block and schematic circuit diagram of a system operable with the system of FIG. 8 to automatically blend a fuel product.

Referring to FIG. 1, a testing engine 12 is shown that is powered by a test fuel whose combustion quality is to be determined. The engine 12 may be of any suitable type such as the standard ASTM-CFR spark ignition engine commonly used to determine the octane ratings of gasolines, for example, or the standard ASTM-CFR compression ignition engine commonly used to determine the cetane ratings of diesel fuels. The fuel is applied to the testing engine 12 from a fuel source 14, which includes the fuel under test and reference fuels. In the case of a spark ignition testing engine, a fuel-air ratio control 16 adjusts the ratio of fuel to air in the engine. A combustion process detector and error signal generator 18 is coupled to the testing engine 12, and, under the control of a control unit 20, generates an error signal which is applied to a servo motor 22. Within the combustion process detector and error signal generator 18, a signal is generated which is representative of detonation of the fuel in the testing engine 12, if the fuel is a gasoline, or ignition of the fuel if the fuel is a diesel fuel, and this signal is compared with a reference signal representative of a standard detonation or ignition. This comparison leads to the generation of the error signal which is applied to the servo motor 22.

For example, under the action of the control unit 20, the combustion process detector and error signal generator 18 may operate to produce an error signal which is representative of the difference in magnitude between a reference detonation signal and a signal representative of detonation of gasoline in the engine. Alternatively, the combustion process detector and error signal generator 18 may produce an error signal representative of the difference in time between the occurrence of a reference detonation or ignition signal and the occurrence of detonation or ignition of the fuel used to power the testing engine 12.

The servo motor 22 is coupled to a combustion process adjuster 24 connected to the testing engine 12. The adjuster 24 may comprise, for example, an arrangement for changing the compression ratio in the testing engine 12. As described in the copending application Ser. No. 160,-052, now U.S. Pat. No. 3,312,102 this may constitute a mechanism for adjusting the position of the engine cylinder head with respect to a reference piston head position. In response to the error signal, the servo motor 22 controls the combustion process adjuster 24 so that detonation or ignition of the fuel in the testing engine is changed to establish the error signal at a reference value. In this fashion, the testing engine 12 is operated at a null point at which detonation or ignition of the fuel conforms to a predetermined standard.

The combustion process adjuster 24 is coupled to a transducer 26 which provides a signal representative of the changes effected in the testing engine 12 by the combustion process adjuster. Signals from the transducer 26 are applied directly to an analog recorder 28 for recordation therein and to a voltage to frequency converter 30. The converter 30 translates the analog signals from the transducer 26 into pulse signals which are applied to a counter 32 under the control of a variable gating control 34 and the control unit 20. The variable gating control 34 determines the time interval over which the counter 32 operates in one of many successive counting cycles. Signals from the counter 32 are applied to a digital recorder 36 which provides an output in digital form of the changes effected by the combustion process adjuster 24.

The data recorded by the analog recorder 28 and the digital recorder 36 may be compared with similar data recorded in the same fashion for one or more reference fuels of known combustion quality, thereby enabling the combustion quality of the test fuel to be determined quickly and easily once its combustion characteristic, as represented by the compression ratio of the testing engine, is bracketed between the characteristics of two known reference fuels.

FIG. 2 shows a circuit that instruments the combustion process detector and error signal generator 18 of FIG. 1 which generates the error signal that is applied to the servo motor 22. Referring to FIG. 2, a pressure pick-up 38 is coupled to the testing engine 12 and may comprise, for example, a transducer positioned within the firing chamber (not shown) of the testing engine. The output from the pick-up thus is representative of the pressure within the firing chamber, which is, in turn, representative of the combustion process of the combustible fuel mixture in the engine.

The output signal from the pick-up 38 is applied to a follower 40 which is used to match impedances between the pick-up and both an amplifier 42 and a knock detector 44 coupled to the output of the follower. The knock detector 44 may be the same as any one of the detonation signal generating circuits shown in FIGS. 2, 3, and 4 of the copending application Ser. No. 160,051, now U.S. Pat. No. 3,238,765, each of which generates a signal representative of detonation or knocking of the combustible mixture in the testing engine 12. Also applied to the knock detector 44 to aid in generating the detonation signal are timing pulses from a timing pulse generator 46 which generates a pulse at a predetermined time in each engine cycle. A squaring amplifier 48 which produces a generally square-shaped output pulse couples the timing pulse generator 46 to the knock detector 44.

The output signals from the knock detector 44, representative of knocking or detonation of the combustible mixture in the testing engine 12, are applied to a metering circuit 50, for direct metering of the signals, as well as to a damping circuit 52 which smooths out minor variations in the signals. The damping circuit 52 is coupled to a safety relay and error signal generating network 54, which also receives signals from a reference detonation signal generator 56. The reference detonation signal generator 56 provides a signal which is representative of a standard detonation magnitude or a standard detonation time at which it is desired to mtaintain the detonation in the testing engine.

The signals from the generator 56 and the damping circuit 52 are compared within the safety relay and error signal generating network 54, which generates an output error signal representative of the difference between the two input signals.

The network 54, however, is under the control of signals from a relay driver 58 that is, in turn, controlled by output signals from a flip-flop 60. Once during each engine cycle, the flip-flop is set by signals from the squaring amplifier 48. During the same engine cycle, the flip-flop 60 is reset by signals from a squaring amplifier 62 which produces a square wave output signal from an input signal received from the follower 40 after amplification in the amplifier 42. The amplifier 42 may provide high-pass filtering so as to amplify and transmit only those signals from the follower 40 of a relatively high frequency corresponding to the high frequency peak in the pressure wave occuring in the engine cylinder of the testing engine 12 as a result of detonation. In this case, the flip-flop 60 is reset during each engine cycle if detonation occurs in the cycle.

If the amplifier 42 does not provide high-pass filtering, then all of the signals from the follower 40 are amplified and applied to the squaring amplifier 62. Such signals represent the high frequency peak corresponding to detonation, the pressure wave corresponding to combustion, and the pressure wave resulting from compression of the gases in the cylinder. The threshold of the squaring amplifier 62 may be set so that only the first two of these signals, which are of relatively high amplitude, are amplified to produce a square wave pulse that resets the flip-flop 60. Thus, the flip-flop is reset in each engine cycle if combustion, which may or may not include detonation, occurs. In the event that no combustion takes place, in which case the signal from the pressure pick-up 38 is representative of only the compression of the gases within the cylinder of the testing engine, the flip-flop 60 is not reset.

Typically, the amplifier 42 provides the high-pass filtering referred to above so that the resetting of the flip-flop 60 is dependent upon the occurrence of detonation during combustion in each engine cycle.

The time constant of the relay driver 58 is established so that if the flip-flop 60 is first set and then immediately reset in the same engine cycle, the relay driver is not actuated. If, however, the flip-flop 60 is set and then is not immediately reset, which is the case if detonation, for example, does not occur in an engine cycle, the relay driver 58 is actuated, thereby providing a control signal to the safety relay and error signal generating network 54. In response to this control signal, the output error signal is automatically established at a reference value, typically zero. In this fashion, the servo motor 22 of FIG. 1 receives no input signal, thereby avoiding driving the combustion process adjuster 24 to one of its two extreme positions when no detonation signal is received in an engine cycle.

It should be noted that valve noise signals do not affect the operation of the circuit of FIG. 2, since such signals occur relatively late in an engine cycle and cannot operate to prevent actuation of the relay driver 58 when no detonation signal is received even though they serve to reset the flip-flop 60. Further, the circuit may also serve to protect against the absence of ignition in the testing of diesel fuels.

FIG. 3 shows a system for testing a plurality of fuels, in particular, gasolines, in a test engine and automating the engine to carry out the different steps of a typical test for each fuel. A warm-up fuel and test fuels 1, 2 . . . n from fuel sources 64–w, 64–1, 64–2 . . . 64–n, respectively, are applied to a fuel selector 66. The fuel selector, under the control of a fuel selector actuator 68, couples one of the warm-up and test fuels to a knock test engine 12'. A knock detector and error signal generator 18' is coupled to the knock test engine and generates an error signal representative of the deviation of the knocking or detonation in the test engine from a predetermined standard, such as detonation of a predetermined magnitude or detonation at a predetermined time in each engine cycle. This error signal is applied to a servo motor 22' which controls a compression ratio adjuster 24', for example, to vary the compression ratio in the test engine to reduce the error signal to a reference value, typically zero. Adjustment of the compression ratio in the test engine by the compression ratio adjuster 24' is detected by a transducer 26' whose output signal is coupled by a gate 70 to appropriate recording and computing circuitry (not sohwn) to determine the octane numbers of the test fuels. Additionally, a fuel-air ratio control 16' is coupled to the knock test engine to vary the fuel-air ratio, i.e., the proportion of fuel in the combustible mixture that is applied to the test engine.

The fuel selector actuator 68, the fuel-air ratio control 16', the servo motor 22', and the gate 70 are all under the control of a sequence control 72 that determines which fuel is supplied to the knock test engine 12', as well as the operation of the engine and the gating of the output signal from the transducer 26'. One such sequence control is shown in FIGS. 4A and 4B, and operates for each fuel selected to adjust first the compression ratio in the test engine by energizing the servo motor 22' so that a standard knocking is achieved. Once this is accomplished, the servo motor is de-energized, and the fuel-air ratio control 16' is energized to adjust the fuel-air ratio until maximum intensity detonation occurs, as detected by the knock detector and error signal generator 18'. Variation of the fuel-air ratio typically involves first decreasing the ratio to a predetermined value and then increasing it to the maximum intensity detonation point. Thereafter, the fuel-air ratio control 16' is de-energized and the servo motor 22' is again energized to readjust the compression ratio to the standard detonation. Following this, the gate 70 is energized, coupling the signal from the transducer 26' to the recording and computing circuitry. The sequence control 72 provides this test procedure for all the test fuels 1, 2 . . . n. After the nth test fuel has been tested, the fuel selector actuator 68 switches the test engine 12' to the warm-up fuel by which it is powered until another test sequence is initiated.

Referring to FIGS. 4A and 4B, a power supply 74 is coupled to a timer 76 and to a start switch 78. Assuming that the knock test engine 12' is operating on the warm-up fuel from the source 64–w, the start switch 78 is momentarily closed, applying power from the power supply 74 to a set input 30 of the timer 76, which commences operation of the timer. The start switch 78 is also coupled by a conductor 81 to a step control input 82 of a stepping switch 84. The stepping switch 84 is actuated to step or move to a first position to provide for the appropriate energization, as will be explained later, of a fuel-air ratio control motor 86–1. At the same time, the fuel selector actuator 68, which is coupled to the stepping switch 84 by a conductor 83, is energized to move the fuel selector 66 to a corresponding position and to switch from the warm-up fuel from the source 64–w to the test fuel 1 in the source 64–1. The correspondence in positions of the stepping switch 84 and the fuel selector 66 through the actuator 68 may be effected by relay and micro switch closures or by appropriate nulling of a servo motor drive arrangement to the proper fuel selector position, for example.

The power supply 74 is also coupled to a single pole, double throw, latching relay 88. The latching relay is normally in a reset condition, applying power to an output conductor 90 coupled to the servo motor 22' to energize the motor. The motor is controlled by the error signal from the knock detector and error signal generator 18' of FIG. 3, and adjusts the compression ratio adjuster 24', as described above, to vary the compression ratio in the knock test engine 12' so that knocking in the engine conforms to a pre-established standard.

The servo motor 22' remains energized by the latching relay 88 until the timer 76 automatically resets itself a predetermined time after being set. Upon being reset, the timer generates an "off" pulse which is coupled by a conductor 92 to a set terminal 94 of the latching relay 88. When set, the latching relay 88 applies power from the power supply 74 to a conductor 96, de-energizing the conductor 90. Thus, the servo motor 22' is de-energized, leaving the compression ratio in the knock test engine 12' fixed at its last setting, and power is applied to a single pole, double throw, latching relay 98.

The relay 98, which is normally reset, applies power from the conductor 96 to a conductor 100 coupled to the stepping switch 84. Depending upon the setting of the switch 84, which is stepped from position to position by signals applied to the step control input 82, the conductor 100 is coupled to one of associated output conductors 100–w, 100–1, 100–2 . . . 100–n. When the test engine 12' is operated by the test fuel 1, the stepping switch 84 couples the conductor 100 to the output conductor 100–1 which is connected to an associated fuel-air ratio control motor 86–1. With the lead 100–1 energized, the motor 86–1 is driven to decrease the fuel-air ratio of the combustible mixture in the knock test engine 12'.

Referring to FIG. 5, there is shown a typical arrangement 102 for varying the fuel-air ratio in the engine 12'. Each of the test fuels 1, 2 . . . n has such an arrangement, and the one for test fuel 1 will be described. The fuel source 64–1 comprises the body of the standard ASTM carburetor assembly shown in FIG. 29 of "ASTM Manual for Rating Motor Fuels by Motor and Research Methods," p. 132 (1960). The test gasoline fills a chamber 104 through a fuel strainer 106 and flows through a needle valve assembly 108 into a float chamber 110. A float 112 positioned within the chamber and attached to a link 114 that pivots about a pin 116 controls the needle valve 108. By the action of the float, the gasoline level in the float chamber is retained relatively constant. Gasoline within the chamber flows outwardly through an outlet 118 to the metering nozzle (not shown) in the carburetor assembly (not shown) of the knock test engine 12'.

The assembly 102 is mounted for up and down movement about a fixed tube 120. A threaded sleeve 122 positioned within the tube is free to slide up and down therein, and is fastened through a slot 123 in the tube to a frame piece 124 of the assembly 102. A threaded rod 126, also positioned within the tube 120 and engaging the threaded sleeve 122, is driven by the fuel-air ratio control motor 86–1. Rotation of the rod 126 causes the threaded sleeve 122 to move upwardly or downwardly within the tube 120, which causes the entire assembly 102 to be raised or lowered. The raising and lowering of the assembly 102 varies the vertical distance between the outlet 118 of the float chamber 110 and the metering nozzle in the engine carburetor, thereby changing the pressure at which the gasoline in the float chamber is applied to the metering nozzle and, consequently, the fuel-air ratio of the combustible mixture in the engine.

A high-level limit switch 128 and a low-level limit switch 130 are also included, and are actuated by a projection 132 carried on the frame piece 124. When the assembly 102 is in a predetermined low position, resulting in a relatively lean fuel-air ratio, the projection 132 actuates the low-level limit switch 130 to apply power from a terminal 134 to an output terminal 136. Similarly, when the assembly 102 is in a predetermined upper position, resulting in a relatively rich fuel-air ratio, the projection 132 actuates the high-level limit switch 128 and applies power from the terminal 134 to an output terminal 138.

Referring again to FIGS. 4A and 4B, power is applied through the conductor 100–1 to the fuel-air ratio control motor 86–1 to reduce the fuel-air ratio until the low-level limit switch 130 (FIG. 5) is actuated, at which time an output pulse appears at the terminal 136. This pulse is applied to a set input 140 of the latching relay 98 to set the relay, thereby removing power from the conductor 100 and applying it to a conductor 142. The conductor 142 is coupled through the stepping switch 84 to one of associated conductors 142–w, 142–1, 142–2 . . . 142–n, depending upon the setting of the switch 84. For the setting of the switch relating to test fuel 1, the conductor 142 is coupled to the conductor 142–1 which is connected to the fuel-air ratio control motor 86–1. With the conductor 142–1 energized, the motor 86–1 is powered to drive the fuel bowl assembly 102 (FIG. 5) upwardly to increase the fuel-air ratio in the knock test engine 12'. The fuel-air ratio is increased until maximum intensity detonation is detected. As pointed out above, increasing the fuel-air ratio to that corresponding to maximum intensity detonation avoids "hangover" effects that might occur if the ratio were decreased to the maximum intensity level.

The detection of the fuel-air ratio producing maximum intensity detonation is accomplished as follows. When the rotation of the fuel-air ratio control motor 86–1 is reversed to increase the fuel-air ratio, the pulse from the low-level limit switch 136 that causes the reversal is applied to a reset input 144 of a peak detector 146 to reset the peak detector. The peak detector is supplied with signals from an averager 148 which averages the signals from the knock detector 44 of FIG. 2, for example. The averager 148 also applies the averaged signals to a comparator 150 which is coupled to the peak detector 146. As long as the signal from the knock detector 44 is increasing, the output signals from the averager 148 and the peak detector 146 are equal. When the signal from the knock detector, however, reaches a maximum and then begins to decrease, the signal from the peak detector 146 is greater than the signal from the averager 148, and this difference is detected by the comparator 150 which generates an output signal.

The output signal from the comparator 150 is applied to reset inputs 152 and 154 of the latching relays 98 and 88, respectively, and resets the relays. The resetting of the relays 98 couples together the conductors 96 and 100, which ordinarily would reverse the direction of rotation of the motor 86–1 to decrease the fuel-air ratio. However, with the resetting of the relay 88, power is no longer applied to the conductor 96 but is applied to the conductor 90 connected to the servo motor 22'. Thus, the fuel-air ratio remains at the level producing maximum intensity knocking in the test engine 12', and the compression ratio of the test engine is once again varied to achieve standard knocking.

The output signal from the comparator 150 is also applied through a conductor 155 to a set input 156 of a timer 158 that is coupled to the power supply 74 through a conductor 159. At a predetermined time after the setting of the timer 158, sufficient to ensure that standard knocking is achieved in the test engine 12', a delayed "on" pulse is generated that is applied to a set input 160 of a single pole, single throw, normally off latching relay 162. The latching relay 162 corresponds to the gate 70 (FIG. 3), and, when set, applies the signal from the transducer 26' (FIG. 3) to an output terminal 164 which may be coupled to appropriate recording and computing circuitry (not shown). Thus, the output signal from the transducer represents the compression ratio of the test engine to produce standard knocking at the fuel-air ratio producing maximum intensity detonation.

When the timer 158 is reset, which is accomplished automatically a predetermined time after the timer is set, an "off" signal is generated which is applied to a reset terminal 166 of the latching relay 162, thus resetting the relay and no longer coupling the transducer 26' to the output terminal 164. This represents the end of a test sequence for a particular fuel.

Concurrently, the "off" signal from the timer 158 is also applied via a conductor 168 and through a switch 170 to the set terminal 80 of the timer 76 and to the step control input 82 of the stepping switch 84. The stepping switch is thus stepped to its next position, and the fuel selector actuator 68 is correspondingly controlled to cause the fuel selector 66 to supply the test engine with the next test fuel. With the timer 76 set, the test sequence described above is initiated for this test fuel. In the example chosen, the next test fuel is the second test fuel, and thus the stepping switch 84 is in the position providing for the selective energization of the fuel-air ratio control motor 86–2, and the fuel selector applies the second test fuel in the fuel source 64–2 (FIG. 3) to the test engine 12'.

After the testing of the $n$th test fuel, the "off" signal from the timer 158 sets the timer 76 and steps the stepping switch 84 to its initial position coupling the input conductors 100 and 142 to the output conductors 100–w and 142–w, respectively, which correspond to the warm-up fuel. No fuel-air ratio control motor, however, is coupled to these conductors. The fuel selector actuator 68 is also controlled to cause the fuel selector 66 to supply the warm-up fuel from the source 64–w (FIG. 3) to the engine 12'. With the timer 76 set, the system of FIGS. 4A and 4B proceeds through the steps described above. However, because the switch 170 is automatically opened when the fuel selector 66 is switched to the warm-up fuel, the next "off" signal from the timer 158 cannot set the timer 76 and cannot step the stepping switch 84 to initiate another set of tests of the test fuels. Accordingly, the test engine 12' remains powered by the warm-up fuel, and, inasmuch as the relay 88 is reset, the servo motor 22' is energized and adjusts the compression ratio of the engine to provide standard detonation. Another set of tests is initiated by actuating the start switch 78.

FIG. 6 shows another circuit for instrumenting the sequence control 72 of FIG. 3. This circuit applies each one of a plurality of test fuels to the knock test engine 12', and, for each fuel, supplies the fuel to the engine in a combustible mixture whose fuel-air ratio varies in a series of discrete steps from one ratio to another, passing through the ratio producing maximum intensity detonation in the test engine. Concurrently, the servo motor 22' is continuously energized to adjust the compression ratio in the test engine to produce a standard detonation.

Referring to FIG. 6, the power supply 74 is coupled through an on-off switch 171 to the servo motor 22'. Thus, the servo motor, which is controlled by the error signal from the knock detector and error signal generator 18', is continuously energized to produce standard detonation in the test engine.

The power supply 74 is also coupled through a switch 172 to a single pole, double throw, latching relay 174. When set by a signal applied to a set input 176, the latching relay couples the power supply 74 to a percent timer 178, which is connected by conductor 142 to stepping switch 84. The stepping switch is the same as the stepping switch 84 of FIG. 4B, and is coupled to fuel-air ratio control motors 86–1, 86–2 . . . 86–n, as in the embodiment of FIGS. 4A and 4B. When the latching relay 174 is reset by a pulse applied to reset input 180, the power supply 74 is coupled by conductor 100 to the stepping switch. Thus, depending upon the position of the stepping switch, which is stepped from position to position by pulse signals applied to step control input 82, the appropriate one of the fuel-air ratio motors 86–1, 86–2 . . . 86–n is driven to decrease or increase the fuel-air ratio in the engine, depending upon which of the input conductors 100 and 142 is energized.

The operation of the control system may be best explained by assuming that the knock test engine 12' is operating upon the warm-up fuel from the source 64–w (FIG. 3). In this case, the stepping switch 84 is in the position where the input conductors 142 and 100 are coupled to the output conductors 142–w and 100–w, respectively. Inasmuch as the fuel-air ratio of the warm-up fuel is not to be changed, the output conductors 142–w and 100–w terminate without going to a corresponding fuel-air ratio control motor.

When it is desired to initiate the testing of the plurality of test fuels 1 through n, a start and step control switch 184 is momentarily actuated to apply a pulse to the step control input 82 of the stepping switch 84. Thus, the stepping switch is stepped so that the input conductors 142 and 100 are coupled to the output conductors 142–1 and 100–1, respectively, connected to the fuel-air ratio control motor 86–1. The fuel selector actuator 68 coupled to the stepping switch 84 by the conductor 83 is controlled to cause the fuel selector 66 (FIG. 3) to change from the warm-up fuel to test fuel 1.

The momentary actuation of the start and step control switch 184 also applies a pulse to the set input 176 of the latching relay 174, thereby setting the relay and applying power to the percent timer 178. The percent timer operates, when energized, to run continuously in a series of successive cycles generating an output signal at the conductor 142 for a predetermined percentage of time during each cycle. Thus, the percent timer generates a series of successive, evenly spaced, pulse signals.

During the time in each of the successive timing cycles that the output conductor 142 from the percent timer 178 is energized, the stepping switch output conductor 142–1 is also energized, thereby driving the fuel-air ratio control motor 86–1 to raise the fuel bowl assembly 102 of FIG. 5 and to increase the fuel-air ratio. For the remainder of the timing cycle, the output conductor 142 from the timer is unenergized, and the fuel bowl assembly remains stationary. As may be seen, then, the percent timer steps the fuel bowl assembly 102 through a series of discrete fuel-air ratios, while the compression ratio of the test engine is concurrently adjusted for standard detonation. The time during each timing cycle that the engine is allowed to remain at the associated fuel-air ratio is for the length of the timing cycle less the duration of the pulse from the percent timer. This time is chosen to be sufficiently long to ensure stable engine operation at that fuel-air ratio.

During the times that the percent timer 178 drives the appropriate fuel-air ratio control motor, the variable gating control 34 (FIG. 1) is inhibited by applying the signal from the timer through a diode 185 or other isolating device, such as a relay, for example, to an inhibiting input 186 of the variable gating control. In this fashion, the counter 32 of FIG. 1 cannot proceed in its series of continuing counting cycles until the fuel-air ratio is at one of its discrete positions. This prevents the generation of output information during the times that the fuel-air ratio control motors are energized.

When the fuel bowl assembly 102 (FIG. 5) has been driven upwardly to the point at which the projection 132 actuates the high-level limit switch 128, power is applied to the terminal 138 (FIG. 6) coupled to the reset terminal 180 of the latching relay 174, thereby resetting the relay. Upon being reset, the relay 174 applies power from the power supply 74 to the conductor 100 of the stepping switch 84 and thence to the conductor 100–1 and the fuel-air ratio control motor 86–1. Thus, the direction of motor rotation is reversed, and the fuel bowl assembly 102 is driven downwardly. During the time that the conductor 100 is energized, power is coupled through a diode 188 or other isolating device to the inhibiting input 186 of the variable gating control 34, thereby inhibiting this control.

When the fuel bowl assembly 102 (FIG. 5) is driven downwardly so that the projection 132 actuates the low-level limit switch 130, power is applied to the output terminal 136. As may be seen from FIG. 6, the output terminal 136 is coupled through a switch 190 to the step control input 82 of the stepping switch 84, as well as to the set input 176 of the latching relay 174. Thus, as soon as the low-level limit switch 130 is actuated, the stepping switch 84, as well as the fuel selector actuator 68, are stepped to the next test fuel, which, in the example chosen, is the test fuel 2. Concurrently, the latching relay applies power from the power supply 74 once again to the percent timer 178, thus to drive the fuel-air ratio control motor 86–2 in a series of steps as described above with regard to the control motor 86–1, and the test is repeated for test fuel 2.

Thus, the circuit of FIG. 6 operates to test all test fuels until the nth test fuel has been tested. When the fuel-air ratio control motor 86–n drives the associated fuel bowl assembly 102–n downwardly and actuates the associated low-level limit switch 130–n, the stepping switch 84 and the fuel selector actuator 68 are stepped to their initial positions. The input conductors 142 and 100 are coupled to the output conductors 142–w and 100–w, respectively, and since there is no associated fuel-air ratio control motor, the entire system remains operating upon the warm-up fuel until another test sequence is initiated by momentarily depressing the start and step control switch 184. During this time, the servo motor 22' controls the compression ratio in the test engine 12' so that standard detonation for the warm-up fuel is achieved.

In the event that manual operation is desired, the switches 190 and 172 are opened. Fuel selection is governed by actuation of the start and step control switch 184 which steps the stepping switch 84 from one fuel to another. Control of the appropriate fuel-air ratio control motor 86 is accomplished by actuating switches 192 and 194. The switch 192 applies power from the power supply 74 to the input conductor 142 of the stepping switch 84, and serves to increase the fuel-air ratio of the combustible mixture applied to the test engine. The switch 194, which is coupled to the stepping switch input conductor 100, serves to decrease the fuel-air ratio.

FIG. 7 shows a system for testing a reference fuel and a test fuel to develop a signal representative of the difference in combustion quality between the fuels. The signal is used, for example, to control the blending of the test fuel so that it conforms in combustion quality to the reference fuel.

Referring to FIG. 7, a test fuel from source 196 and a reference fuel from a source 198 are applied to a fuel selector 200. The fuel selector is actuated by a fuel selector actuator 202 under the control of a timing control 204, which sequentially applies the test and reference fuels to a testing engine 12". A combustion process detector and error signal generator 18" is coupled to the testing engine 12" and generates an error signal which is applied through a relay coupling 206 to a servo motor 22". The error signal is representative of the deviation of the combustion process in the testing engine 12" from a pre-established standard, and controls the servo motor 22" so that a combustion process adjuster 24" coupled thereto adjusts the engine to conform the combustion process to the standard. Typically, the adjuster 24" constitutes an arrangement for varying the compression ratio in the testing engine 12".

The adjustment of the testing engine 12" by the adjuster 24" is translated by a transducer 26" into a signal which is applied to a safety and guide curve control and combustion quality error signal generator 208. The unit 208 also receives signals from the timing control 204, and develops control signals which are applied to the relay coupling 206 and to a signal alarm 210 in the event of improper engine operation. To elaborate, if the engine 12" is operating at an extremely high compression ratio, for example, a signal is developed which is applied to the relay coupling 206 to remove the control of the servo motor 22" from the combustion process detector and error signal generator 18". The servo motor 22" is then automatically regulated to reduce the compression ratio to a predetermined lower setting, at which the engine is maintained until it is manually reset to continue with automatic operation. If, when the testing engine 12" is supplied with a reference fuel from the source 198, the compression ratio in the testing engine is not within a predetermined range in which it should be if the engine is operating properly under standard operating conditions, a signal is developed which is applied to the signal alarm 210. The alarm is actuated to provide a visual or audible alarm advising technical personnel that the engine needs adjustment.

The unit 208 also operates to note the adjustment of the testing engine 12" by the adjuster 24" for both the test and reference fuels. A signal is developed representative of the difference between such adjustments, and is applied to an output terminal 212. This signal, then, represents the difference in combustion quality between the test and reference fuels. Inasmuch as the engine 12" is continuously and alternately supplied with the test and reference fuels, the engine is automatically calibrated as often as necessary, as determined by the timing control 204, to provide an extremely accurate output signal.

The combustion quality error signal from the unit 208 is also applied to a blending control 214 which regulates a blending process 216. Thus, if the test fuel in the source 196 is the fuel blended by this process, the process is continuously controlled so that the combustion quality of the fuel product produced thereby bears a predetermined relation to the combustion quality of the reference fuel in the source 198.

FIG. 8 shows in detail a typical system in accordance with FIG. 7, which will be described in connection with the testing of a gasoline as a representative fuel. A knock detector and error signal generator 218 detects knocking or detonation in the testing engine 12" and generates an error signal representative of the deviation of the knocking from a standard, which is typically a predetermined magnitude of detonation. The error signal developed by the generator 218 is applied to a relay network 220 which is adapted to be set when power from a power supply 222 is momentarily applied to a set input 224 through a switch 226. When set, the relay network applies the error signal from the generator 218 to a servo motor 228, which actuates a compression ratio adjuster 230 to adjust the compression ratio in the testing engine 12" so that detonation in the engine conforms to the predetermined standard.

The compression ratio adjuster 230 is coupled by a coupling 232 to movable contact 234 of potentiometer 236. The potentiometer is biased by a potential source 238 and an associated potentiometer 240. Accordingly, the potential developed at the movable potentiometer contact 234 is representative of the compression ratio in the testing engine 12" as regulated by the compression ratio adjuster 230.

The signal from the movable potentiometer contact 234 is applied via a conductor 242 to a network 243 comprising resistors 244 and 246, potential source 248, and potentiometers 250 and 252. The potential source 248 and the potentiometer 250 provide suitable biasing. Movable contact 254 of the potentiometer 252 is coupled to an amplifier 256, the other input of which is derived from movable contact 257 of potentiometer 258. The potentiometer 258 is biased by the potential source 238 and the associated potentiometer 240.

The output signal from the amplifier 256 is developed on two output conductors 260 and 262. The conductor 260 is coupled to a motor 264 which drives the movable contact 254 of the potentiometer 252. The conductor 260 is also connected to a motor 266 that is coupled by a coupling 268 to the movable contact 257 of the potentiometer 258. The other conductor 262 from the amplifier 256 is connected to movable contact 270 of a switch 272. The contact 270 is electrically connected either to terminal 274 coupled to the motor 266 or to terminal 276 coupled to the motor 264. The position of the movable contact 270 is determined by a relay 278 which is energized by a cycle timer 280 that is also coupled to a fuel selector actuator 282 which actuates the fuel selector 200 of FIG. 7.

Under the action of the cycle timer 280 and the fuel selector actuator 282, the testing engine 12" is continuously and alternately powered by the test fuel from the source 196 and the reference fuel from the source 198 shown in FIG. 7. When the reference fuel is supplied to the testing engine, the relay 278 is de-energized and the switch 272 is in the position shown in FIG. 8, energizing the motor 266 which drives the movable contact 257 of the potentiometer 258. In this position of the switch 272, the motor 264 is de-energized, fixing the movable contact 254 of the potentiometer 252 in its last position.

As the engine is supplied with the reference fuel and the compression ratio adjuster 230 makes appropriate adjustments of the compression ratio in the testing engine to achieve standard detonation, the signal from the movable contact 234 of the potentiometer 236 varies, representing these changes in compression ratio. This signal is applied to the network 243 wherein it is algebraically added to the fixed signal developed by the network, the composite signal being developed at the potentiometer contact 254 and applied to the amplifier 256. The amplifier drives the motor 266 to vary the adjustment of the movable potentiometer contact 257 until the signal developed at this contact is equal to the signal at the fixed potentiometer contact 254. The motor 266 thus is driven until the signal from the movable potentiometer contact 257 is equal to algebraic the signal from the movable potentiometer contact 234 minus the fixed signal developed by the network 243.

Algebraic sum is used in this specification and appended claims to mean that magnitude of the signal thus generated is determined by the polarity of the signals that are added.

During the supplying of the reference gasoline to the engine, then, the potentiometer 258 is adjusted until its output signal represents the compression ratio in the engine 12" minus a fixed factor represented by the fixed signal from the network 243. Accordingly, the potentiometer 258 is calibrated so that the setting of its movable contact 257 is representative of the compression ratio in the engine 12" when operated by the reference fuel.

When, under the action of the cycle timer 280, the test fuel is applied to the testing engine, the relay 278 is energized, thereby actuating the switch 272, which energizes the motor 264 and de-energizes the motor 266. Accordingly, the setting of the movable contact 257 of the potentiometer 258 is fixed at its previously calibrated setting, and the movable contact 254 of the potentiometer 252 is varied until the input signals to the amplifier 256 are equal. Thus, the motor 264 adjusts the potentiometer 252 until the signal from the contact 254 is equal to the signal from the movable potentiometer 234 minus the signal from the potentiometer contact 257. The position of the potentiometer contact 254, therefore, represents the compression ratio in the engine 12" to provide standard detonation for the test fuel minus the compression ratio on the engine to provide standard detonation for the reference fuel.

The movement of the motor 264 in adjusting the movable potentiometer contact 254 is recorded by a recording pen 284 coupled to the motor. A movable contact 286 of a potentiometer 288 is also coupled to the motor 264. This potentiometer is biased by a source of potential 290, which also serves to bias another potentiometer 292. Movable contact 294 of the potentiometer 292 is coupled to an output terminal 296. The movable contact 286 of the potentiometer 288 is coupled to terminal 298 of a switch 300. In the position of the switch shown in FIG. 8, a second output terminal 302 is coupled to the first output terminal 296 through movable switch contact 304.

When the reference fuel is applied to the testing engine 12" under the action of the cycle timer 280 and the relay 278 is de-energized, the output signal appearing at the output terminals 296 and 302 are equal, each at a potential determined by the potentiometer 292. When the relay 278 is energized, however, during the supplying of the test fuel to the testing engine, the movable switch contact 304 couples the output terminal 302 to the movable potentiometer contact 286. This output terminal is thus supplied with a signal representative of the difference between the compression ratio to provide standard detonation in the engine for the test fuel presently applied to the engine and the compression ratio established for the reference fuel previously applied to the engine. The signal at the output terminal 296 remains constant as determined by the setting of the potentiometer 292.

The potentiometer 292 is incorporated to provide a "floating base" correction signal for the output signals. If the signal at the potentiometer contact 294 is at ground level, for example, the potential difference between the output terminals 296 and 302 during the application of the test fuel to the engine represents the difference between the compression ratios in the engine for the reference and test fuels. If the potential at the movable potentiometer contact 294 is at other than ground level, however, the potential difference between the output terminals 296 and 302 represents this difference in compression ratios minus a fixed compression ratio. This fixed compression ratio is equivalent to the amount by which the compression ratio in the engine would have changed to produce standard detonation if a different reference fuel had been applied to the engine. Thus, although the engine may actually be calibrated with a reference gasoline of, say, 90 octane number, by appropriate variation of the movable potentiometer contact 294, the potential difference between the output terminals 296 and 302 may be taken to represent the octane number difference between the test fuel and a reference fuel of 92 octane number, for example.

As may be noted, under the action of the cycle timer 280, the test and reference fuels are alternately applied to the testing engine, with the engine being calibrated each time the reference fuel is applied thereto. The timing cycle can be chosen so that the engine is calibrated periodically once during every half hour of operation, for example, the calibrating time taking perhaps five minutes. During this time, the output signals at the terminals 296 and 302 are rendered equal, and thus any control function responsive to the difference between the signals is rendered inoperative during calibration of the engine. In this respect, the relay 278 may incorporate time delay action to permit the engine to be stabilized on the test fuel, when a change is made from the reference fuel back to the test fuel, before the output terminal 302 is coupled to the potentiometer 288 and the output error signal is developed.

The circuit of FIG. 8 contemplates a safety control which renders fixed the compression ratio in the engine if the compression ratio is increased at any time to a dangerously high value. If such a compression ratio is encountered, a high compression ratio limit switch (not shown) typically forming a portion of the compression ratio adjuster 230 is actuated, applying a signal to a terminal 306. This sets a relay network 308 which in its set position applies power from the power supply 222 to the relay network 220 to energize the servo motor 228 in such a fashion as to decrease the compression ratio. At the same time, the relay network 220 is reset by the signal from the input terminal 306, thereby removing the control of the servo motor 228 from the knock detector and error signal generator 218.

When the compression ratio in the testing engine 12" has been lowered to a predetermined point, another limit switch (not shown) typically in the compression ratio adjuster 230 is actuated, thereby appying a signal to an input terminal 310. This signal resets the relay network 308, thereby removing power from the relay network 220. This de-energizes completely the servo motor 228, which leaves the compression ratio adjuster 230 fixed at its last setting until the switch 226 is manually actuated to commence again automatic operation of the engine.

The system of FIG. 8 further contemplates the actuating of a signal alarm 312 if the operation of the engine, when powered by the reference fuel, is determined to be "off the guide curve." To elaborate, because of the close tolerances established for the engine operation by the American Society for Testing Materials, the adjustment of the compression ratio in the engine to achieve standard detonation for a particular reference fuel can be predicted within very close limits. Accordingly, if at any time the compression ratio in the engine when powered by the reference fuel falls outside these limits, it is known that something is wrong with the engine operation.

Accordingly, a pair of limit switches (not shown) typically in the compression ratio adjuster 230 are adapted to be actuated when the compression ratio in the engine falls outside of a predetermined range. When actuated, the limit switches generate output signals which are applied to input terminals 314 and 316 coupled to a switch terminal 318 of switch 320. Movable contact 322 of the switch 320 is controlled by the relay 278, and when the relay is de-energized, i.e., when the reference fuel is supplied to the testing engine, the switch is in the position shown and the movable contact couples the terminal 318 to the signal alarm 312. Accordingly, if signals are developed at either one of the terminals 314 and 316, indicating improper or off-guide-curve operation, the signal alarm 312 is actuated, providing a suitable visual or audible alarm, for example. When the relay 278 is energized during the supplying of the test fuel to the engine, the terminal 318 is no longer coupled to the signal alarm 312.

FIG. 9 shows a system for controlling a blending operation in accordance with the output octane deviation signal developed by the system of FIG. 8. Referring to FIG. 9, the terminals 296 and 302 represent the output terminals from the system of FIG. 8, and any difference in potential therebetween represents the difference in octane number between the test and reference gasolines as explained above. A cycle timer 324 periodically energizes a holding relay 326 which remains energized for a predetermined period of time.

When the holding relay is de-energized, three switches 328, 330 and 332 are in the positions shown in the figure. Thus, movable contact 334 of the switch 328 couples the output of an amplifier 336 to a motor 338 which determines the setting of movable contact 340 of potentiometer 342. The movable potentiometer contact 340 is coupled through movable switch contacts 344 and 346 to the amplifier 336, the other input to which is derived from movable contact 348 of potentiometer 350. The potentiometers 342 and 350 are suitably biased by a source of potential 352 and a potentiometer 354. The motor 338 drives the movable potentiometer contact 340 until the signal developed at that contact is equal to the signal developed at the potentiometer contact 348.

When the holding relay 326 is energized by the cycle timer 324, the switch 328 is actuated, thereby coupling the output of the amplifier 336 to a motor 356 which drives the movable potentiometer contact 348. The motor 338 is de-energized, leaving the movable potentiometer contact 340 fixed at its previous setting. Concurrently, the switch 330 is actuated, coupling the input terminal 302 to the potentiometer 340 and establishing the potential of the contact at that of the terminal. At the same time, the input terminal 296 is coupled to the amplifier 336. The movable potentiometer contact 348 is now driven by the motor 356 until the input signals to the amplifier are rendered equal. This is accomplished when the signal from the movable potentiometer contact 348 is changed by an amount equal to the difference between the signals appearing at the input terminals 296 and 302, inasmuch as the movable potentiometer contacts 340 and 348 were previously adjusted so that the potentials developed at the contacts were equal. The time during which the holding relay 326 retains the switches 328, 330, and 332 in their actuated positions must be sufficiently long to ensure that this is accomplished.

The motor 356 is also coupled to a valve 358 which is moved in accordance with the movement of the potentiometer 348. Thus, the valve setting is changed by an amount proportional to the difference in potential between the input terminals 296 and 302. The valve 358 varies the amount of a blending component which is applied to a blender 360 which receives other fuel components through an input line 362. The blended fuel product is conveyed away from the blender through an output conduit 364. Accordingly, the composition of the blended product is changed by an amount proportional to the difference in octane number between the reference and test fuels. In a blending system such as is shown, the blended fuel product typically is the test fuel which is applied to the test engine. Accordingly, the composition of the test fuel is varied until it bears some predetermined relation to the octane number of the reference fuel.

The action of the cycle timer 324 may provide for the changing of the composition of the blended fuel product as often as necessary in response to a noted deviation in octane number of the test fuel from the reference fuel, as represented by the error signal applied to the terminals 296 and 302. In each case, when the relay 326 is de-energized, the potentiometer contact 340 is moved to generate a signal equal to that generated by the potentiometer contact 348. When the relay is energized, the contact 348 and the valve 358 are then moved by an amount proportional to the error signal at the terminals 296 and 302. Thus, each change of the valve is made proportional to the error signal. During calibration of the testing engine, when terminals 296 and 302 are at the same potential, no movement of the valve 358 can result. Thus, the valve remains at its last setting until calibration is finished. In this fashion, the cycle timer 324 and the cycle timer 280 (FIG. 8) can operate independently of each other.

From the description of the invention, it is apparent that a system has been provided for automatically operating a test engine used to determine the combustion quality of an automotive fuel, as well as automatically calibrating the engine and employing the engine as a control element in a blending process. It is apparent that the specific apparatus disclosed may be modified without departing from the essence of the invention. To cite one such modification as an example, in the embodiment of FIGS. 4A and 4B, as well as in the embodiment of FIG. 6, the fuel-air ratio of the combustible mixture in the engine is increased so that it is adjusted to or passes through the ratio producing maximum intensity detonation. If desired, the ratio could be decreased to or through this point. Accordingly, the invention should be taken to be defined by the following claims.

I claim:

1. In apparatus for blending a fuel product having a predetermined combustion quality wherein a representation of the octane number of a test gasoline with respect to the octane number of a reference gasoline is provided through the sequential application of the reference and test gasolines to an engine having a repetitive operating cycle and adjustable means for controlling the compression ratio in the engine, the combination of means for sequentially applying the reference and the test gasolines to the engine, means for generating a signal representative of a predetermined standard detonation, means for adjusting the adjustable means to establish detonation in the engine according to the predetermined standard detonation signal, means for generating a first output representative of the adjustment of the adjustable means when the engine is powered by the reference fuel, means for generating a second output representative of the adjustment of the adjustable means when the engine is powered by the test fuel, means for generating a third output representative of a target fuel combustion quality which differs from the reference fuel combustion quality by a predetermined amount, means for generating a control output representative of the algebraic sum of the first, second and third outputs, and means for varying the composition of the fuel product in response to the control output.

2. Apparatus as recited in claim 1, wherein said composition varying means comprises means for periodically detecting the control output, and means responsive to the periodically detected control output for varying the composition of the fuel product.

3. Apparatus as recited in claim 1 wherein said means for adjusting the adjustable means is continuously operative to establish detonation in the engine according to the predetermined standard.

4. A method of blending a fuel product having a predetermined combustion quality wherein a sample of the blended fuel product is applied to an engine having a repetitive operating cycle and an adjustable compression ratio, comprising the steps of:

applying a reference fuel to said engine, adjusting the compression ratio of the engine while operating on the reference fuel to establish a predetermined detonation intensity, generating a signal representative of the adjustment of the compression ratio of the engine while operating on the reference fuel, generating a correction signal representative of the difference between a target fuel combustion quality which differs from the reference fuel combustion quality by a predetermined amount, applying said fuel product to the engine, adjusting the compression ratio of the engine while operating on the fuel product to establish the predetermined detonation intensity, generating a signal representative of the adjustment of the compression ratio of the engine while operating on the fuel product, generating an error signal representative of a function of an algebraic sum of the reference fuel compression ratio adjustment signal, the fuel product compression ratio adjustment signal and the correction signal, and varying the composition of the fuel product in response to the error signal.

5. A method of blending a fuel product having a predetermined combustion quality wherein a sample of the blended fuel product is applied to an engine having a repetitive operating cycle and an adjustable compression ratio, comprising the steps of:

applying a reference fuel to said engine, adjusting the compression ratio of the engine while operating on the reference fuel to establish a predetermined detonation intensity, generating a signal representative of the compression ratio setting of the engine while operating on the reference fuel at the predetermined detonation intensity, storing said reference fuel compression ratio setting signal, applying said fuel product to the engine, adjusting the compression ratio of the engine while operating on the fuel product to establish the predetermined detonation intensity, generating a signal representative of the compression ratio setting of the engine while operating on the fuel product at the predetermined detonation intensity, generating an error signal representative of the difference between said stored reference fuel compression ratio setting signal and said fuel product compression ratio setting signal, generating a correction signal representative of a compression ratio setting to provide a target fuel combustion quality which differs from the reference fuel combustion quality by a predetermined amount, generating a control signal representative of a function of the difference between the error signal and said correction signal, and varying the composition of the fuel product in response to the control signal.

References Cited

UNITED STATES PATENTS 3,383,904  5/1968  Jones et al. _____ 73—35

JAMES J. GILL, Primary Examiner

U.S. Cl. X.R.

73—35